Patented Mar. 4, 1947

2,416,926

UNITED STATES PATENT OFFICE 2,416,926

PRESSURE-SENSITIVE ADHESIVE TAPES

Milton H. Kemp, Oak Park, Ill., assignor to The Kendall Company, Boston, Mass., a corporation of Massachusetts No Drawing. Application July 27, 1943,
Serial No. 496,308

2 Claims. (Cl. 117—122)

This invention relates to pressure-sensitive adhesive sheet materials, and more particularly to surgical adhesive tapes.

Crude rubber has for many years been a basic ingredient of successful surgical tape adhesives. When crude rubber is present in sufficient proportion, and proper formulation is observed, the crude rubber does impart to an adhesive those characteristics expected of a good quality surgical tape adhesive, and standards for surgical tape have been based, both officially and unofficially, upon the performance of adhesives which have about a 30% crude rubber content.

Thus the 11th revision of the U. S. Pharmacopaeia currently in force sets forth the following standard for surgical tape rating:

"The plaster mass . . . must contain about 30 per cent of pure rubber."

The Federal Standard Stock Catalog, U–P–401, sec. IV (part 5) of June 30, 1936, also currently in force, provides:

"C–1a. Type I plaster, adhesive, surgical, shall be made of a cotton fabric backing, coated on one side with an adhesive mass containing not less than 30 per cent of thoroughly washed, new rubber . . ."

Both of these official standards illustrate the point that satisfactory surgical tape quality has been considered to be wholly dependent upon formulation with 30 per cent pure rubber.

Now that the supply of crude rubber is problematical, the maintenance of standards derived from its unlimited use has become an acute problem in the surgical tape field.

The main object of this invention is to provide an adhesive tape which conforms to the requirements necessary for classification as a surgical adhesive tape, but which can be compounded with substantial savings in crude rubber without lowering the quality of the tape below the standards required for surgical tape use. Since tapes made in accordance with this invention are suitable for surgical tape use even though a 30% crude rubber content is not present in the adhesive thereof, it becomes necessary to define standards for determination of suitability of adhesives for use as surgical tape adhesives other than by crude rubber content. Such other standards have always heretofore been met in high quality 30% rubber content surgical tape adhesives and are more critical than the mere rubber content standard. These other standards, aside from desirable commercial attributes relating to color, odor and skin irritability, are as follows:

1. *Unrolling.*—First and foremost is the major requirement that the tape be capable of being unwound when rolled upon itself, in the absence of interliners, without ruinous separation or delamination of the adhesive mass through transfer of the mass to the underlying layer of the roll. This capability is imparted to an otherwise satisfactory adhesive by reason of an inherent elasticity in the mass which can be observed in a present-day 30% crude rubber adhesive type of surgical tape by the tendency of the mass to extend and snap back as it is unrolled from the underlying layer during the unrolling process.

2. *Adhesion.*—As referred to in this application, adhesion is determined by laying a strip of the tape to be tested, 1 inch wide and of convenient length, tacky surface down upon a smooth surfaced Bakelite panel, under temperature conditions of 70° F. The panel is then placed in a 15° inclined position and a 7 lb. roller, which is free to move vertically, is passed over the strip at the rate of 1 foot per minute up and back to adhere the pressure-sensitive surface to the panel. One end of the strip is then attached to the clamp of a tensile strength Scott tester and the average number of pounds required to pull a substantial length of tape off the Bakelite surface at an approximate 180° angle and at a rate of 1 foot per minute is determined. A minimum adhesion for surgical tape use is an average of ¾ of a pound, and a desirable minimum adhesion is closer to 1¼ pounds.

This adhesion test is more critical than the adhesion test contained in the above referred to Section of the Federal Standard Stock Catalog, paragraphs D–5 and F–2b, wherein the test involves a straight pull and not a 180° angle stripping.

3. *Aging.*—Within the meaning of this specification, aging is determined by an accelerated test. This test is designed to simulate in one week the effects of a year's oxidation under decidedly adverse storage conditions. It comprises storage of the tape under 300 pounds oxygen pressure at 105° F. for a period of one week. Thereafter the tape should still meet the minimums for adhesion and creep described in paragraphs 2 and 4 hereof, and be capable of satisfactory unrolling as described in paragraph 1.

4. *Cohesion.*—This standard is determined by a creep test which involves laying a 1 inch strip of the tape several inches in length, tacky side down, over a horizontally disposed, raised, 1 inch diameter Bakelite cylinder, and suspending a 1 pound weight from each end of the tape. The apparatus is then placed in an oven at 105° F. for a period of fifteen minutes. The tape is then slashed across the top of the cylinder, the cylinder being provided with any necessary slot for permitting such slashing. The time required for either portion of the tape to fall from the cylinder represents the "creep" of the tape.

The minimum creep for the purposes of surgical tape is ten minutes, and preferably a tape should not separate from the cylinder in this test until after 25 or 30 minutes. As will be understood, a flypaper or other similar soft mass would, under the above test at 105° F., slide off the cylinder almost instantaneously.

In the production of surgical adhesive tapes in accordance with this invention, it is therefore contemplated that the tapes will conform to each and all of the above standards for unrolling, minimum adhesion, aging and cohesion, despite a substantial crude rubber content reduction.

Because crude rubber has heretofore been unrestrictedly available for industrial tape use as well as for surgical tape use, many industrial tapes have adhesives, following the practice established in the surgical tape field, formulated with the 30% crude rubber content, and often with even a greater rubber content. When bearing adhesives so formulated, industrial tapes may conform to all the above surgical tape standards.

On the other hand, it is widely recognized that standards for some industrial pressure-sensitive adhesive tapes may be much less strict than the standards pertaining to surgical tape. For instance, for some industrial purposes, it is not necessary that the tapes fulfill requirement 1. Such tapes need not be rolled upon themselves either during manufacture or merchandising. Under such circumstances, there is much wider latitude in the permissible choice of an adhesive than in the preparation of tapes which must, like surgical tape, fulfill requirement 1 as to unrolling. Some pressure-sensitive adhesives having reduced rubber content are, therefore, described only in connection with the preparation of industrial sheets or tapes which are designed for packaging in flat sheet form, not roll form; or are designed for roll packaging only when faced with separator sheets or interliners. Reduced rubber content has been permissible in such cases because softness and lack of cohesion of the adhesive is counteracted by the use of the slip sheets.

Again, one of the important and frequent uses of surgical tape is in strapping injured body portions. Here the adhesive sheet is relied upon to give actual support to injured body parts, and maintenance of the desired support is directly dependent upon portions of the tape remaining anchored in the applied position, as prescribed by the skill of the physician during initial application. This quality is controlled by the creep of the tape. It should have a minimum of creep—that is, it should have sufficient grab and mass cohesion to maintain the sheet in proper position without undue tendency to slip relative to the surface to which it has been applied, and thus reduce such supporting tension as the physician may have chosen to use at the time of its application.

This quality of creep is very difficult to attain in the absence of the usual 30% crude rubber content, and, while pressure-sensitive adhesive tapes for industrial use, wherein the creep quality may not be so strict, may be formulated with reduced crude rubber content, such adhesive tapes do not have a creep standard, in conjunction with the ability to unroll, sufficient to permit their use in the field as a surgical tape.

A usual formula for a high quality surgical adhesive tape adhesive which will meet all of the above standards, contains ingredients in about the following proportions:

| | Per cent |
|---|---|
| Crude rubber | 30 |
| Normally solid resin (rosin) | 28 |
| Zinc oxide | 20–25 |
| Non-volatile liquid plasticizer (mineral oil or lanolin) | 4–5 |
| Inert filler (starch) | 7–8 | together with small quantities of wax, anti-oxidant, and stain inhibitor.

It will be noted that the ratio of rosin to rubber in the above given formula is less than 1 to 1, and universal observation of this 1 to 1 rubber-resin ratio as a maximum has been the rule in commercial formulation of surgical adhesives conforming to the standards as defined above. Often and commonly the rosin to rubber ratio has been much lower. If the rosin percentage is raised above the crude rubber percentage, the adhesive becomes resinous in character with very bad physical effects. In the main, the increase in rosin content so reduces the elasticity that the mass is too hard and inelastic to meet the adhesion standard previously referred to; and if, in an attempt to counteract the hardness, the plasticizer content is increased, the mass will lose its cohesion and become soft and mushy or, anyway, be incapable, in tape form, either of satisfactory unrolling, or of meeting the minimum standards for creep or adhesion or both. Published literature sustains this prevailing recognition of the importance of maintaining a rubber to resin ratio not less than 1 to 1 in rubber-resin adhesives. Increase of rosin and/or plasticizer can not therefore be looked to as a means for reducing the rubber percentage.

In an application Serial No. 496,307 filed concurrently herewith on July 27, 1943, I have disclosed a surgical adhesive tape having an adhesive in which the crude rubber content has been reduced to about 20%, resulting in up to 33% saving in rubber.

In accordance with this invention, crude rubber content of surgical adhesives may be reduced not only to 20%, but as low as 10%, without causing departure from the minimum standards required for surgical tape use, as hereinbefore specified, and resulting in up to 66% savings in crude rubber. As in the case of the invention of my co-pending application, the reduction in crude rubber content is made possible by increasing the capacity of the adhesive to hold a secondary non-voltatile liquid plasticizer; but instead of increasing this capacity by utilizing a high melting point resin, I have found that increased capacity can be produced by a controlled vulcanization or sulfurization of the crude rubber-resin constituents of the adhesive during formulation of the adhesive, and that sufficient increased capacity may be secured, even when the crude rubber content is so low as to amount to only ½ of the resin content, and does not exceed 10% of the adhesive. As in the case of the invention of my co-pending application, the increased capacity to hold secondary liquid non-volatile plasticizers (lanolin or mineral oil) permits the plasticizer content to be so increased that the resinous characteristics resulting from the preponderant resin to rubber ratio can be overcome without the plasticizer content rendering the adhesive soft and mushy. Plasticizer content may range from 10 to 15%, normally solid resin constituent should be about 20%, and the filler content (zinc oxide, starch, titanium dioxide, lithopone) may be increased up to 50 to 60% of the mix.

This invention, like that of my co-pending application, is therefore based upon a complete revision of accepted practice with regard to the rubber-resin ratio in surgical pressure-sensitive adhesive formulation.

A typical formula in accordance with this invention is as follows:

| | Per cent |
|---|---|
| Crude rubber | 10 |
| Normally solid resin (equal portions of hydrogenated rosin and dehydrogenated rosin) | 20 |
| Zinc oxide | 36 |
| Starch | 18 |
| Secondary non-volatile liquid plasticizer (2½ parts lanolin to 1 part mineral oil) | 14 |
| Wax and anti-oxidants | 2 |
| Vulcanizing ingredient (Tuads—tetra methyl thiuram disulphide) | 0.2 |

During formulation, this mixture is subjected to a vulcanization temperature. For this purpose the adhesive can be conveniently admixed on a rubber mill. The crude rubber constituent can be preliminarily broken down in the usual manner, and a portion of the other ingredients, such as the rosin and fillers, are added on the cold mill; while the mix is still firm and cool, the vulcanizing agent is added and thoroughly milled into the mix. After all the ingredients have been added and blended, the temperature of the mill is raised above 250° F. and kept there until the vulcanizing ingredient has completed its reaction. Because the proportion of vulcanizing ingredient is restricted, only a partial vulcanization or sulfurization takes place which does not prevent the retention of normally tacky pressure-sensitive qualities in the adhesive.

After sulfurization, the mass may then be transferred directly from the mill to a calender and applied to a suitable backing material such as cloth, in accordance with usual calendering practices as a preformed pressure-united sheet. Preferably the adhesive is not allowed to cool down between mixing and calendering. In general, a coat should amount to between 4.5 and 7 ounces per square yard.

If a higher crude rubber content is permissible, the plasticizer content may be reduced in inverse proportion to the increase in rubber content. The vulcanizing ingredient should be kept roughly on a basis of .2% by weight of the adhesive mass, so that the weight of the vulcanizing agent to the rubber increases as the rubber proportion of the adhesive is reduced from 20% down to 10%.

The particular vulcanizing ingredient used is a matter of choice. Tuads is particularly acceptable because of its critical vulcanization temperature, but mention may be made of zinc dimethyl dithiocarbamate; mercapto benzothiozol, diphenyl guanidine, in combination with sulfur.

The creep results on cloth tape of a 10% rubber content adhesive prepared in accordance with this invention will run as high as 97 minutes, and the adhesion as high as 2.3 lbs. After the aging test, as hereinbefore described, the adhesion remains excellent and the creep will usually substantially increase. In all cases, the tape may be unrolled from roll form without delamination.

While surgical tape is generally manufactured with cloth backings, it should be understood that when used in this application, the term "surgical tape" is used as a standard of quality of the adhesive as spread on the tape, and is not used with any limiting significance, either as to the type of backing which may be cloth, paper, regenerated cellulose, or any other type of flexible backing, or as to the use of the tape which may be surgical, industrial or otherwise. Therefore, regardless of its backing and regardless of its designed use, a tape is considered a surgical tape within the meaning of this application and as bearing a surgical tape adhesive within the meaning of this application whenever the tape will meet the standards herein set forth for surgical tape adhesives.

I claim:

1. A surgical adhesive tape comprising a flexible sheet backing material bearing on one side thereof a uniform exposed coating of a normally tacky viscous plastic pressure-sensitive adhesive having as its cohesive base a sulfurized admixture of crude rubber and resin, and containing a non-volatile liquid plasticizer and pulverulent filler in the following amounts by weight of the adhesive: crude rubber component from 10 to 12½%, resin component not more than about 20% but in excess of the amount of crude rubber component, non-volatile liquid plasticizer from 10 to 15%, and pulverulent filler from 50 to 60%.

2. A surgical adhesive tape comprising a flexible sheet backing material bearing on one side thereof a uniform exposed coating of a normally tacky viscous plastic pressure-sensitive adhesive having as its cohesive base a sulfurized admixture of crude rubber and resin, and containing non-volatile liquid plasticizer and pulverulent filler in the following amounts by weight of the adhesive: crude rubber component from 10 to 20%; resin in excess of the amount of crude rubber component but not more than 20%; non-volatile liquid plasticizer from 10 to 15%; and pulverulent filler from 50 to 60%.

MILTON H. KEMP.

REFERENCES CITED

The following references are of record in the file of this patent:

UNITED STATES PATENTS

| Number | Name | Date |
|---|---|---|
| 1,315,109 | Garlick | Sept. 2, 1919 |
| 2,021,063 | Henharen | Nov. 12, 1935 |
| 2,164,359 | Strauch | July 4, 1939 |
| 1,956,579 | Kallander | May 1, 1934 |
| 2,187,563 | Thomas | Jan. 16, 1940 |
| 2,208,619 | Armor et al. | July 23, 1940 |
| 2,251,273 | Drew | Aug. 5, 1941 |
| 2,331,894 | Drew | Oct. 19, 1943 |

Certificate of Correction

Patent No. 2,416,926. March 4, 1947.

MILTON H. KEMP

It is hereby certified that error appears in the printed specification of the above numbered patent requiring correction as follows: Column 6, line 50, claim 2, before "20%" insert *about*; and that the said Letters Patent should be read with this correction therein that the same may conform to the record of the case in the Patent Office.

Signed and sealed this 13th day of May, A. D. 1947.

[SEAL]

LESLIE FRAZER,
*First Assistant Commissioner of Patents.*